(12) United States Patent
Nakadori

(10) Patent No.: US 10,071,736 B2
(45) Date of Patent: Sep. 11, 2018

(54) DRIVING ASSISTANCE APPARATUS FOR VEHICLE

(71) Applicant: TOYOTA JIDOSHA KABUSHIKI KAISHA, Toyota-shi (JP)

(72) Inventor: Minoru Nakadori, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 84 days.

(21) Appl. No.: 15/215,390

(22) Filed: Jul. 20, 2016

(65) Prior Publication Data
US 2017/0021832 A1    Jan. 26, 2017

(30) Foreign Application Priority Data
Jul. 22, 2015  (JP) ................ 2015-145028

(51) Int. Cl.
*G06F 7/00*   (2006.01)
*B60W 30/16*  (2012.01)
(Continued)

(52) U.S. Cl.
CPC .......... *B60W 30/16* (2013.01); *B60W 30/143* (2013.01); *B60W 30/18* (2013.01); (Continued)

(58) Field of Classification Search
CPC .... B60W 30/16; B60W 10/06; B60W 10/184; B60W 2720/106; B60W 2550/402; B60W 30/143; B60W 30/188; B60W 10/04; B60W 10/18; B60W 2520/105; B60W 2540/10; B60W 2540/12; B60W 2710/0666; B60W 2720/10; B60W 50/082; B60W 2050/0095; B60W 2510/0652; B60W 2550/308; B60W 2710/0605; B60W 2710/0644; B60W 2710/0661; B60W 2710/105; B60W 30/182; B60W 50/08; B60W 50/087;
(Continued)

(56) References Cited

U.S. PATENT DOCUMENTS 5,821,878 A * 10/1998 Raswant ................ G08G 1/081
                                                   340/907
6,273,204 B1    8/2001 Winner et al.
(Continued)

FOREIGN PATENT DOCUMENTS

DE         198 43 395 A1    3/2000
DE    10 2007 036 787 A1    2/2009
(Continued)

*Primary Examiner* — Khoi H Tran
*Assistant Examiner* — Jorge O Peche
(74) *Attorney, Agent, or Firm* — Oblon, McClelland, Maier & Neustadt, L.L.P.

(57) ABSTRACT

A driving assistance apparatus for a vehicle includes: a switch selecting a drive mode that specifies an output characteristic of a drive source relative to an accelerator operation amount; and a controller configured to calculate a target acceleration, based on the drive mode, for causing a host vehicle to follow a preceding vehicle such that a vehicle-to-vehicle distance between the host vehicle and the preceding vehicle is maintained at a distance within a predetermined range, and control a driving force of the drive source such that the host vehicle accelerates at the target acceleration.

4 Claims, 5 Drawing Sheets

(51) Int. Cl.
*B60W 30/18* (2012.01)
*F02D 41/10* (2006.01)
*F02D 41/12* (2006.01)
*F02D 29/02* (2006.01)
*B60W 30/14* (2006.01)

(52) U.S. Cl.
CPC ............. *F02D 29/02* (2013.01); *F02D 41/10* (2013.01); *F02D 41/12* (2013.01); *B60W 2520/105* (2013.01); *B60W 2550/304* (2013.01); *B60W 2550/308* (2013.01); *B60W 2710/0666* (2013.01); *B60W 2720/10* (2013.01); *B60W 2720/106* (2013.01); *F02D 2200/501* (2013.01); *F02D 2200/606* (2013.01); *F02D 2200/701* (2013.01); *F02D 2250/18* (2013.01)

(58) Field of Classification Search
CPC .......... B60W 2050/0096; B60W 20/10; B60K 31/0066; B60T 7/12; B60T 2201/02; F02D 2250/18; F02D 2200/606; F02D 41/10; F02D 41/12
See application file for complete search history.

(56) References Cited

U.S. PATENT DOCUMENTS

| | | | | |
|---|---|---|---|---|
| 9,834,220 B2* | 12/2017 | Hemes | ................. | B60W 50/082 |
| 2001/0012976 A1* | 8/2001 | Menig | ................... | B60K 35/00 |
| | | | | 701/1 |
| 2001/0044691 A1* | 11/2001 | Ishizu | ................ | B60K 31/0083 |
| | | | | 701/93 |
| 2002/0082893 A1* | 6/2002 | Barts | .................... | G06Q 10/063 |
| | | | | 705/334 |
| 2002/0107106 A1* | 8/2002 | Kato | ................. | B60K 31/0008 |
| | | | | 477/110 |
| 2002/0152015 A1* | 10/2002 | Seto | ................. | B60K 31/0008 |
| | | | | 701/96 |
| 2006/0015236 A1* | 1/2006 | Yamaguchi | .......... | B60K 17/356 |
| | | | | 701/69 |
| 2007/0136123 A1* | 6/2007 | Schiller | ............ | G06Q 10/06375 |
| | | | | 705/7.37 |
| 2007/0208580 A1* | 9/2007 | Schiller | ................ | G06Q 10/063 |
| | | | | 705/7.11 |
| 2007/0272464 A1* | 11/2007 | Takae | ................... | B60W 10/06 |
| | | | | 180/169 |
| 2007/0276577 A1* | 11/2007 | Kuge | .................... | B60W 10/06 |
| | | | | 701/96 |
| 2008/0078600 A1* | 4/2008 | Inoue | ................ | B60K 31/0066 |
| | | | | 180/170 |
| 2008/0228334 A1* | 9/2008 | Hashimoto | ............ | B60K 6/365 |
| | | | | 701/22 |
| 2009/0164071 A1 | 6/2009 | Takeda | | |
| 2010/0152963 A1 | 6/2010 | Heckel et al. | | |
| 2010/0217486 A1* | 8/2010 | Taguchi | .................. | B60T 7/042 |
| | | | | 701/41 |
| 2012/0095671 A1* | 4/2012 | Matsunnura | .......... | G08G 1/161 |
| | | | | 701/117 |
| 2014/0114553 A1 | 4/2014 | Abdul-Rasool et al. | | |
| 2014/0136414 A1* | 5/2014 | Abhyanker | ............ | G06Q 50/28 |
| | | | | 705/44 |
| 2014/0335994 A1* | 11/2014 | Otake | ................... | B60W 10/06 |
| | | | | 477/3 |
| 2015/0202770 A1* | 7/2015 | Patron | .................... | G05D 1/024 |
| | | | | 700/245 |
| 2015/0210290 A1* | 7/2015 | Hemes | ................ | B60W 50/082 |
| | | | | 701/36 |
| 2015/0274029 A1* | 10/2015 | Tanaka | ...................... | B60L 7/18 |
| | | | | 701/22 |
| 2016/0159353 A1* | 6/2016 | Yun | ........................ | B60W 10/06 |
| | | | | 701/93 |
| 2016/0171894 A1* | 6/2016 | Harvey | ................ | G05D 1/0088 |
| | | | | 701/23 |
| 2016/0244057 A1* | 8/2016 | Kelly | .................. | B60W 30/143 |
| 2016/0272205 A1* | 9/2016 | Kato | ......................... | B60T 7/12 |
| 2016/0273468 A1* | 9/2016 | Kato | ......................... | B60T 7/12 |
| 2017/0272971 A1* | 9/2017 | Boban | ............... | H04W 28/0215 |

FOREIGN PATENT DOCUMENTS

| | | |
|---|---|---|
| DE | 10 2009 004 102 A1 | 7/2010 |
| EP | 0 989 012 A2 | 3/2000 |
| JP | 10-109565 A | 4/1998 |
| JP | 2008-002456 A | 1/2008 |
| JP | 2008-120302 A | 5/2008 |
| JP | 2009-149243 A | 7/2009 |
| JP | 2014-151679 A | 8/2014 |
| KR | 10-2014-0020355 A | 2/2014 |
| KR | 10-1428361 B1 | 6/2014 |

\* cited by examiner

| SELECTED DRIVE MODE | DELIVERY DESTINATION | | |
|---|---|---|---|
| | A | B | C |
| ECO | ECO | ECO | ECO |
| NORMAL | NORMAL LO | NORMAL LO | NORMAL HI |
| SPORT | NORMAL LO | NORMAL HI | SPORT |

DRIVING ASSISTANCE APPARATUS FOR VEHICLE

INCORPORATION BY REFERENCE

The disclosure of Japanese Patent Application No. 2015-145028, filed on Jul. 22, 2015 including the specification, drawings and abstract, is incorporated herein by reference in its entirety.

BACKGROUND OF THE DISCLOSURE

1. Field of the Disclosure

The disclosure relates to a driving assistance apparatus for a vehicle, the driving assistance apparatus executing following control, which is control for causing a host vehicle to follow a preceding vehicle.

2. Description of Related Art

As proposed in Japanese Patent Application Publication No. 2008-2456 (JP 2008-2456 A), a drive mode can be switched between a plurality of modes including a normal mode, an eco-mode, and a sport mode. The drive modes specify output characteristics of an engine relative to accelerator depression amounts. In the eco-mode, the engine output relative to the accelerator depression amount is limited in comparison with the normal mode in order to conserve fuel. In the sport mode, on the other hand, the engine output relative to the accelerator depression amount is set to be slightly larger than in the normal mode so as to improve a responsiveness by which the engine output responds to an accelerator operation. The drive mode is switched by a selection operation performed by a driver (i.e., in accordance with preferences of the driver).

Incidentally, a driving assistance apparatus that causes a host vehicle to travel so as to follow a preceding vehicle travelling in front of the host vehicle may be employed in a vehicle to lighten a driving operation load of the driver. This control for causing the host vehicle to follow the preceding vehicle will be referred to as following control. During the following control, a target acceleration that enables the host vehicle to follow the preceding vehicle is calculated such that a vehicle-to-vehicle distance between the host vehicle and the preceding vehicle is maintained at a distance within a predetermined range, whereupon an engine or a brake apparatus is controlled on the basis of the target acceleration.

In a vehicle having both switchable drive modes and a following control function, however, the drive mode selected by the driver is not reflected during execution of the following control. In other words, the target acceleration calculated during the following control is calculated without taking the drive mode into account, and therefore the following control cannot be implemented in accordance with the preferences of the driver.

SUMMARY OF THE DISCLOSURE

The disclosure implements following control in accordance with preferences of a driver.

An aspect of the present disclosure is a driving assistance apparatus for a vehicle, including: a switch selecting a drive mode that specifies an output characteristic of a drive source relative to an accelerator operation amount; and a controller configured to calculate a target acceleration, based on the drive mode, for causing a host vehicle to follow a preceding vehicle such that a vehicle-to-vehicle distance between the host vehicle and the preceding vehicle is maintained at a distance within a predetermined range, and control a driving force of the drive source such that the host vehicle accelerates at the target acceleration.

The driving assistance apparatus is applied to a vehicle in which the drive mode specifying the output characteristic of the travel drive source relative to the accelerator depression amount can be switched by a selection operation performed by the driver. At least one of an eco-mode that is useful for conserving fuel, a sport mode in which an output response of the travel drive source relative to an accelerator operation is high, and so on, for example, can be selected in addition to a normal mode serving as a normal drive mode. An engine or a motor can be employed, as the travel drive source. Needless to mention, a travel drive source combining an engine and a motor, such as that of a hybrid vehicle, may also be employed.

The driving assistance apparatus executes following control, which is control for causing the host vehicle to follow the preceding vehicle such that the vehicle-to-vehicle distance between the host vehicle and the preceding vehicle is maintained at a distance within a predetermined range. To ensure that the following control can be implemented in accordance with the preferences of the driver, the driving assistance apparatus includes the drive mode obtaining means, the target acceleration calculating means, and the driving force controlling means.

The drive mode obtaining means obtains the drive mode of the host vehicle. The drive mode is set by a selection operation performed by the driver, or in other words in accordance with the preferences of the driver. The target acceleration calculating means calculates the target acceleration at which the following control is to be executed on the basis of the drive mode. For example, the target acceleration calculating means calculates the target acceleration to be larger in a drive mode where the output of the travel drive source relative to the accelerator depression amount is large.

The driving force controlling means controls the driving force of the travel drive source so that the host vehicle accelerates at the calculated target acceleration. According to the aspect of the disclosure, therefore, the following control can be implemented in accordance with preferences of the driver.

In the aspect of the disclosure, the controller may be configured to obtain a delivery destination which is a territory in which the host vehicle is sold, and calculate the target acceleration based on the drive mode and the delivery destination. In this case, the controller may be configured to store a plurality of following acceleration characteristics in a larger number than a number of drive modes that is selected by the switch, select one of the following acceleration characteristic from the plurality of following acceleration characteristics based on a combination of the drive mode and the delivery destination, and calculate the target acceleration in accordance with the selected following acceleration characteristic.

The delivery destination obtaining means obtains the delivery destination, i.e., the territory in which the host vehicle is sold (the territory in which the host vehicle is used). The delivery destination may represent a lame area such as Europe, Asia, or North America, for example, or may be defined more narrowly. The target acceleration calculating means calculates the target acceleration at which the following control is to be executed on the basis of the drive mode and the delivery destination. As a result, the following control can be implemented in accordance with the preferences of the driver within a range where a suitable following acceleration characteristic for the delivery destination is obtained.

BRIEF DESCRIPTION OF THE DRAWINGS

Features, advantages, and technical and industrial significance of exemplary embodiments of the disclosure will be described, below with reference to the accompanying drawings, in which like numerals denote like elements, and wherein.

DETAILED DESCRIPTION OF EMBODIMENTS

Figure 1:
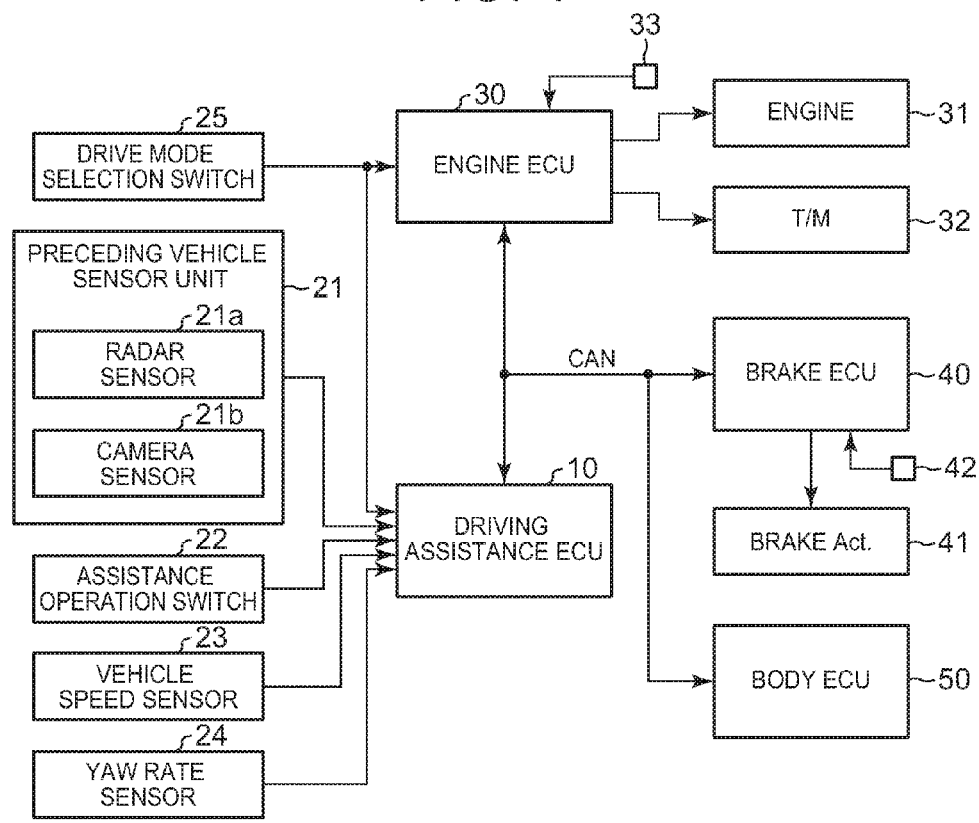
FIG. 1 is a schematic view showing a system configuration of a driving assistance apparatus for a vehicle according to an embodiment.

An embodiment of the disclosure will be described in detail below using the drawings. FIG. 1 is a schematic view showing a system configuration of a driving assistance apparatus for a vehicle according to this embodiment.

The driving assistance apparatus for a vehicle according to this embodiment includes a driving assistance ECU 10. The driving assistance ECU 10 is a device for assisting driving performed by a driver, and includes a microcomputer as a main part thereof The driving assistance ECU 10 according to this embodiment assists the driving performed by the driver by causing a host vehicle to follow a preceding vehicle such that a vehicle-to-vehicle distance between the preceding vehicle and the host vehicle is maintained at a distance within a predetermined range, and by causing the host vehicle to travel at a constant speed, i.e., a set vehicle speed set by the driver, when no preceding vehicle exists. Note that in this specification, the microcomputer includes a central processing unit (CPU), storage devices such as a read only memory (ROM) and a random access memory (RAM), and so on, and the CPU realizes various functions by executing instructions (programs) stored in the ROM. Further, ECU is an abbreviation of Electronic Control Unit.

The driving assistance ECU 10 is connected to an engine ECU 30, a brake ECU 40, and a body ECU 50 by a controller area network (CAN) so as to be capable of exchanging signals.

The driving assistance ECU 10 is connected to a preceding vehicle sensor unit 21, an assistance operation switch 22, a vehicle speed sensor 23, a yaw rate sensor 24, and a drive mode selection switch 25. The preceding vehicle sensor unit 21 has a function for obtaining information relating to a preceding vehicle existing in front of the host vehicle, and includes, for example, a radar sensor 21a and a camera sensor 21b. The preceding vehicle sensor unit 21 may be any device capable of detecting a preceding vehicle and detecting a distance between the host vehicle and the preceding vehicle, and does not necessarily have to include both the radar sensor 21a and the camera sensor 21b. Instead, the preceding vehicle sensor unit 21 may be configured to include one of these sensors or another sensor.

The radar sensor 21a emits millimeter wave radio waves frontward, for example, and when a preceding vehicle exists, receives reflected waves from the preceding vehicle. On the basis of a radio wave emission timing, a reflected wave reception timing, and so on, the radar sensor 21a calculates the presence of a preceding vehicle, a distance (to be referred to as a host-vehicle-to-preceding-vehicle distance) between the host vehicle and the preceding vehicle, a relative speed (to be referred to as a preceding vehicle relative speed) between the host vehicle and the preceding vehicle, and so on, and outputs calculation results to the driving assistance ECU 10. The camera sensor 21b includes a stereo camera, for example, and captures left and right images of the landscape in front of the vehicle. On the basis of left and right image data captured in this manner, the camera sensor 21b calculates the presence of a preceding vehicle, the host-vehicle-to-preceding-vehicle distance, the preceding vehicle relative speed, and so on, and outputs calculation results to the driving assistance ECU 10. Hereafter, information expressing the presence of a preceding vehicle, the host-vehicle-to-preceding-vehicle distance, the preceding vehicle relative speed, and so on will be referred to as preceding vehicle information.

The assistance operation switch 22 is operated by a driver operation in order to output operation signals to the driving assistance ECU 10. The assistance operation switch 22 outputs the following operation signals.

(1) A signal for switching a driving assistance function ON and OFF.
(2) A signal for switching between a constant speed control mode and a following control mode.
(3) A signal for setting a vehicle speed for constant speed travel.
(4) A signal for setting a vehicle-to-vehicle distance (long/ medium/short) in the following control mode.

In the constant speed control mode, constant speed control is implemented. In the following control mode, following control is implemented when a preceding vehicle exists, and the constant speed control is implemented when a preceding vehicle does not exist (when a preceding vehicle that may serve as a vehicle-to-vehicle control subject is not found). The constant speed control is control for causing the host vehicle to travel at a constant speed, i.e., a set vehicle speed set using the assistance operation switch 22. The following control is control for causing the host vehicle to follow the preceding vehicle on the basis of the preceding vehicle information such that the vehicle-to-vehicle distance between the preceding vehicle and the host vehicle is maintained at a distance within a predetermined, range that corresponds to the vehicle speed. When either the constant speed control or the following control is implemented, the driver is not required to perform an accelerator pedal operation.

The assistance operation switch 22 does not necessarily have to be configured so that the functions described above are achieved by a single operator (a lever or the like), and may be configured so that the functions described above are realized by a combination of a plurality of operators. The driving assistance ECU 10 stores parameters (the vehicle speed used during constant speed travel, the vehicle-to-vehicle distance used during the following control, and so on) set by the driver using the assistance operation switch 22 in a nonvolatile memory. The vehicle speed set by the driver using the assistance operation switch 22 and used during constant speed travel will be referred to as a set vehicle speed Vset.

The vehicle speed sensor 23 outputs a detection signal indicating a vehicle speed Vn of the host vehicle to the driving assistance ECU 10. The yaw rate sensor 24 outputs a detection signal indicating a yaw rate Yaw of the host vehicle to the driving assistance ECU 10.

The drive mode selection switch 25 is an operation switch used by the driver to select a drive mode in accordance with his/her preferences. In this embodiment, the drive mode selection switch 25 is configured to be capable of selecting one of three drive modes, namely a normal mode, an eco-mode, and a sport mode. A drive mode selection signal indicating the drive mode selected by the drive mode selection switch 25 is output to the driving assistance ECU 10 and the engine ECU 30. Note that the drive mode is not limited to these three modes, and any two or more drive modes may be provided in a selectable fashion.

Figure 2:
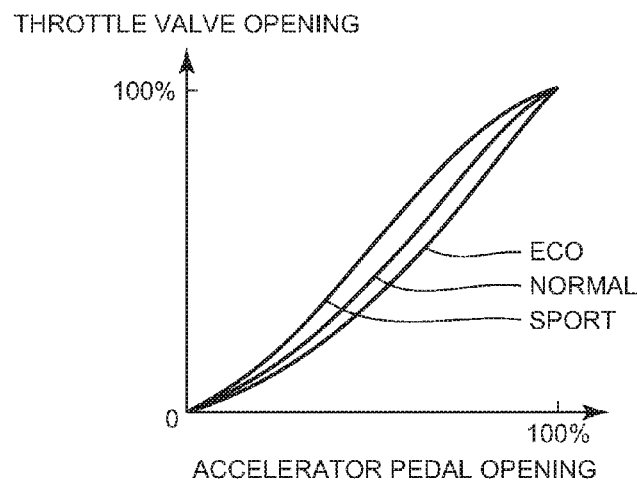
FIG. 2 is a graph illustrating engine output characteristics in respective drive modes.

The drive mode specifies an output characteristic of an engine 31 relative to an accelerator depression amount. FIG. 2 is a graph illustrating engine output characteristics in the respective drive modes. In the eco-mode, the engine output (a throttle valve opening) is set at a small value relative to the accelerator depression amount in order to conserve fuel. In the sport mode, on the other hand, the engine output is set at a large value relative to the accelerator depression amount in order to increase a responsiveness by which the engine output responds to an accelerator operation in comparison with the normal mode.

The engine ECU 30 stores the engine output characteristics of the respective drive modes. The engine output characteristics of the respective drive modes differ according to a territory (to be referred to as a delivery destination) in which the vehicle is sold, even among vehicles of the same model. In other words, the engine output characteristics of the respective drive modes that are stored in the engine ECUs 30 of vehicles sold at various delivery destinations differ according to the delivery destination, For example, at delivery destinations A, B, and C, the engine output relative to the accelerator depression amount in the sport mode is set as (delivery destination A specification)<(delivery destination B specification)<(delivery destination C specification). Further, the engine output relative to the accelerator depression amount in the normal mode at the delivery destinations A, B, and C is set as (delivery destination A specification) <(delivery destination B specification)<(delivery destination C specification), for example. Furthermore, the engine output relative to the accelerator depression amount in the eco-mode at the delivery destinations A, B, and C is set as (delivery destination A specification)=(delivery destination B specification)=(delivery destination C specification), for example. Hence, the engine output characteristics of the respective drive modes are set individually using the delivery destination as a unit. Note that the delivery destination represents a large area such as Europe, Asia, or North America, for example, but may be defined more narrowly.

The engine ECU 30 is connected to various sensors 33 required to control the engine 31 and to control a transmission 32. The engine ECU 30 implements fuel injection control, ignition control, and intake air amount control on the engine 31 on the basis of a required driving force calculated in accordance with the drive mode. Further, the engine ECU 30 performs shift control on the transmission 32 on the basis of an upshift line and a downshift line determined in advance in relation to the vehicle speed and the throttle opening.

During the constant speed control and the following control, the driving assistance ECU 10 calculates a target acceleration of the host vehicle, and calculates a required driving force F* (including a negative value, or in other words a required braking force) required for the host vehicle to accelerate (including deceleration performed when the target acceleration takes a negative value) at the target acceleration. The driving assistance ECU 10 transmits the required driving force F* to the engine ECU 30. The engine ECU 30 controls the engine 31 and the transmission 32 in accordance with the required driving force F*. When the required driving force F* takes a value indicating that a large braking force is required, and the required braking force is too large to be realized by the engine 31 and the transmission 32 alone, the engine ECU 30 transmits the required braking force to the brake ECU 40 so that the shortfall is generated using a hydraulic brake. Note that when the constant speed control is implemented, a constant speed travel target acceleration is calculated such that the need for a braking force requiring the hydraulic brake does not arise.

The brake ECU 40 includes a microcomputer as a main part thereof, and is connected to a brake actuator 41. The brake actuator 41 is provided on a hydraulic circuit (not shown) between a master cylinder that pressurizes brake fluid in accordance with a brake pedal and a wheel cylinder built into a brake caliper of each vehicle wheel. Various sensors 42 required to control the brake actuator 41 are connected to the brake ECU 40. The brake ECU 40 controls an operation of the brake actuator 41 on the basis of the required braking force such that a frictional braking force is generated in the vehicle wheels.

The body ECU 50 stores vehicle type information. The vehicle type information includes delivery destination information. The delivery destination information is information indicating the delivery destination, i.e., the territory in which the host vehicle is sold. In this specification, the sales territory is divided into three delivery destinations, namely a delivery destination A, a delivery destination B, and a delivery destination C. The body ECU 50 transmits the vehicle type information (including the delivery destination information) to the CAN.

Next, functions of the driving assistance ECU 10 will be described. The engine ECU 30 described above is set at specifications corresponding to the delivery destination at which the host vehicle is sold. For example, the engine ECU 30 is configured to store engine output characteristics corresponding to the respective delivery destinations and the delivery destination information indicating the delivery destination of the host vehicle so that engine output characteristics corresponding to the delivery destination of the host vehicle are obtained. Alternatively, the engine ECU 30 may be a dedicated ECU from which engine output characteristics corresponding to a specific delivery destination are obtained. The driving assistance ECU 10, on the other hand, is formed to common specifications in all of the delivery destinations in order to achieve component standardization. Hence, as will be described below, the driving assistance ECU 10 obtains the delivery destination information from the body ECU 50, and implements the following control using a following acceleration characteristic corresponding to the delivery destination.

Figure 3:
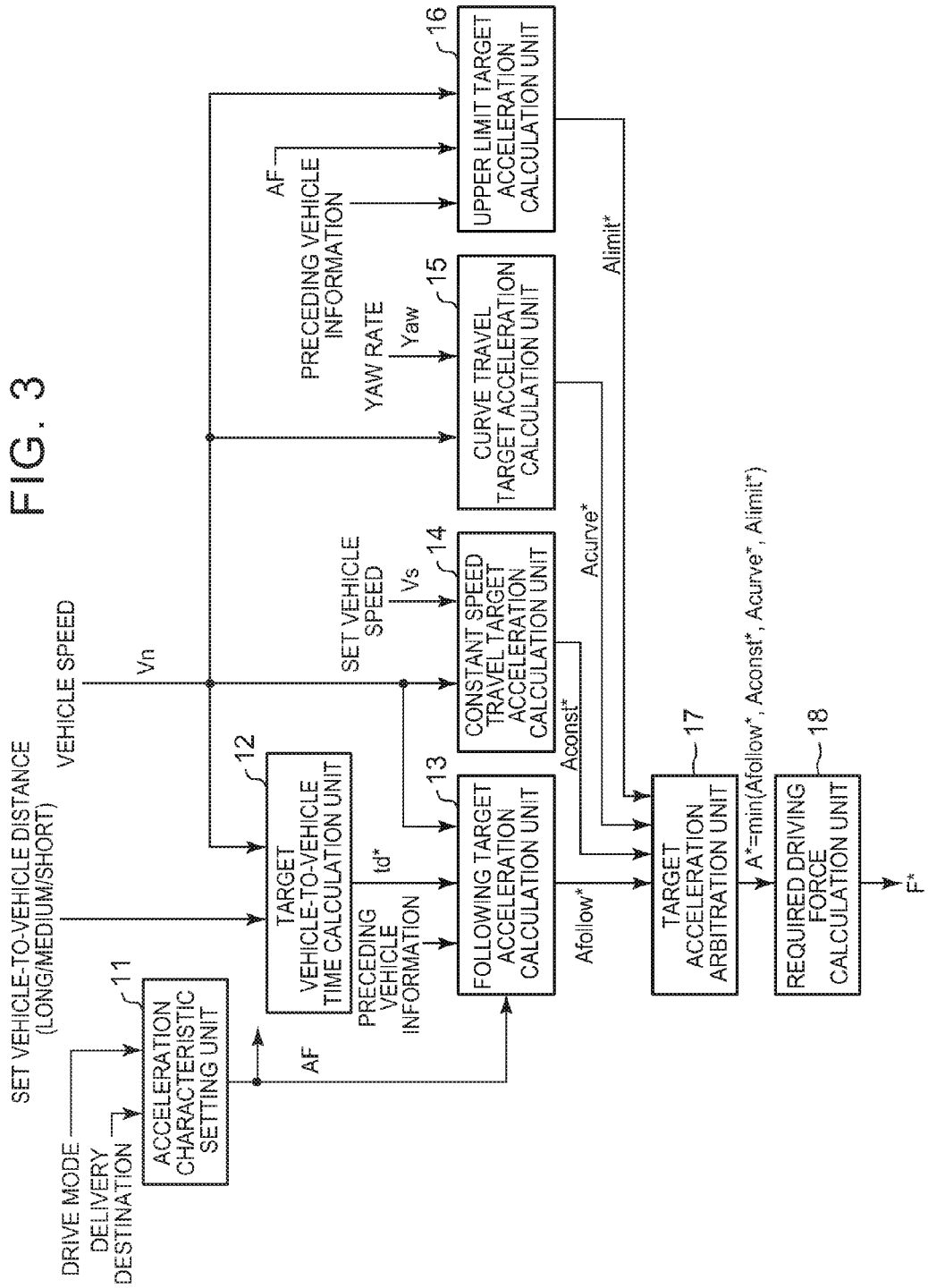
FIG. 3 is a block diagram showing functions of a microcomputer provided in a driving assistance ECU 10.

FIG. 3 is a block diagram showing functions of the microcomputer provided in the driving assistance ECU 10. The driving assistance ECU 10 includes an acceleration characteristic setting unit 11, a target vehicle-to-vehicle time calculation unit 12, a following target acceleration calculation unit 13, a constant speed travel target acceleration calculation unit 14, a curve travel target acceleration calculation unit 15, an upper limit target acceleration calculation unit 16, a target acceleration arbitration unit 17, and a required driving force calculation unit 18. The respective control blocks (11 to 18) implement calculation processing, to be described below, repeatedly at predetermined calculation period intervals in parallel during a period in which the driving assistance function has been switched ON by the assistance operation switch 22. Note that in actuality, the CPU of the driving assistance ECU 10 realizes the functions of the respective control blocks (11 to 18) by executing a program stored in the ROM of the driving assistance ECU 10. Further, the driving assistance ECU 10 uses various sensor detection values while executing the various calculations, and unless specified otherwise, the most recent values at the time of calculation are used as the sensor detection values.

[Acceleration Characteristic Setting Unit]

Figures 4, 5:
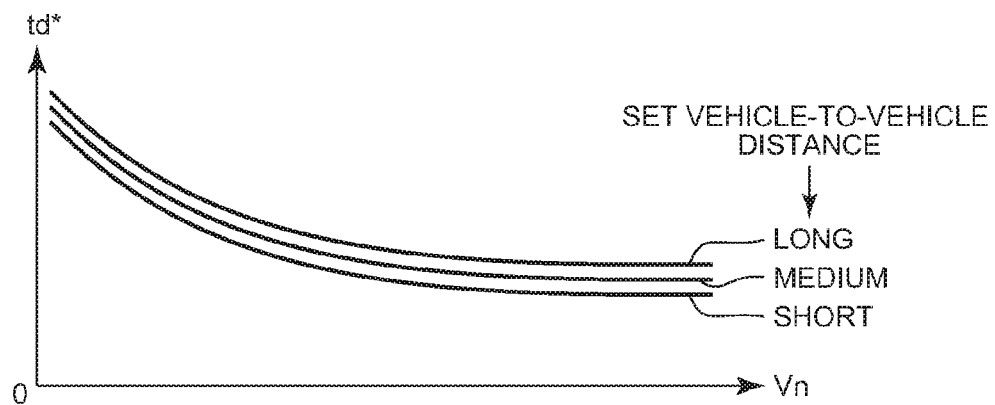
FIG. 4 is a following acceleration characteristic table on which following acceleration characteristics are set in accordance with the drive mode and a delivery destination.
FIG. 5 is a graph illustrating a target vehicle-to-vehicle time map.

The acceleration characteristic setting unit 11 is a control block that sets the following acceleration characteristic on the basis of the drive mode selected by the driver and the delivery destination of the host vehicle. The acceleration characteristic setting unit 11 receives a mode selection signal output from the drive mode selection switch 25 and the delivery destination information transmitted from the body ECU 50. A following acceleration characteristic setting table shown in FIG. 4 is stored in the acceleration characteristic setting unit 11. On the following acceleration characteristic setting table, the drive mode indicated by the mode selection signal and the delivery destination indicated by the delivery destination information are associated with each other such that one of four following acceleration characteristics is determined univocally from a combination of the drive mode and the delivery destination.

The following acceleration characteristic is an acceleration characteristic exhibited when the host vehicle is caused to follow the preceding vehicle, and in this embodiment, an eco-travel acceleration characteristic, a sport travel acceleration characteristic, and two normal travel acceleration characteristics are prepared. Magnitudes of control parameters used to determine the target acceleration when the host vehicle is caused follow the preceding vehicle are set in accordance with the following acceleration characteristic. The number of following acceleration characteristics is larger than the number of drive modes that can be set by the driver using the drive mode selection switch 25 so as to be able to respond to the engine output characteristic in each drive mode at all of the delivery destinations.

The normal travel acceleration characteristic is provided in two types, namely a normal LO travel acceleration characteristic close to the eco-travel acceleration characteristic, and a normal HI travel acceleration characteristic close to the sport travel acceleration characteristic.

The acceleration at which the host vehicle is caused to follow the preceding vehicle is largest in the sport travel acceleration characteristic, and decreases sequentially in the normal HI travel acceleration characteristic, the normal LO travel acceleration characteristic, and the eco-travel acceleration characteristic.

The following acceleration characteristics at the respective delivery destinations are set in accordance with the engine output characteristics of the respective delivery destination specifications. More specifically, a following acceleration characteristic according to which the following control is implemented at a large acceleration is set in a vehicle having delivery destination specifications according to which the engine output characteristic (the engine output relative to the accelerator depression amount) is set on the high side, while a following acceleration characteristic according to which the following control is implemented at a small acceleration is set in a vehicle having delivery destination specifications according to which the engine output characteristic is set on the low side.

For example, the engine output characteristic when the drive mode is the sport mode is set as (delivery destination A specification)<(delivery destination B specification)<(delivery destination C specification), and therefore the following acceleration characteristic is set accordingly. In this example, the following acceleration characteristic when the drive mode is the sport mode is set at the normal LO travel acceleration characteristic at delivery destination A, the normal HI travel acceleration characteristic at delivery destination B, and the sport travel acceleration characteristic at delivery destination C.

Further, the engine output characteristic when the drive mode is the normal mode is set as (delivery destination A specification)<(delivery destination B specification)<(delivery destination C specification), and therefore the following acceleration characteristic is set accordingly. In this example, the following acceleration characteristic when the drive mode is the normal mode is set at the normal LO travel acceleration characteristic at delivery destinations A and B, and at the normal HI travel acceleration characteristic at delivery destination C. Note that the same following acceleration characteristic is set at delivery destinations A and B to avoid an unnecessary increase in the number of following acceleration characteristics.

Further, in the eco-mode, the engine output characteristic is set as (delivery destination A specification)=(delivery destination B specification)=(delivery destination C specification), and therefore the eco-travel acceleration characteristic is set as the following acceleration characteristic at all of the delivery destinations A, B, and C.

Note that this way of setting the following acceleration characteristics is merely an example, and the following acceleration characteristics should be set in accordance with the incline of the engine output characteristics in the respective drive modes and the respective delivery destination specifications.

By referring to the acceleration characteristic setting table (FIG. 4), the acceleration characteristic setting unit 11 sets a following acceleration characteristic AF in accordance with a combination of the drive mode expressed by the mode selection signal and the delivery destination expressed by the delivery destination information. The acceleration characteristic setting unit 11 then supplies the set following acceleration characteristic AF to the following target acceleration calculation unit 13 and the upper limit target acceleration calculation unit 16.

[Target Vehicle-to-vehicle Time Calculation Unit]

The target vehicle-to-vehicle time calculation unit 12 is a control block that calculates a target vehicle-to-vehicle time when the host vehicle follows the preceding vehicle. The target vehicle-to-vehicle time calculation unit 12 calculates the target vehicle-to-vehicle time on the basis of the vehicle speed Vn detected by the vehicle speed sensor 23, and a set vehicle-to-vehicle distance (long/medium/short) that is set by the driver and stored. More specifically, the target vehicle-to-vehicle time calculation unit 12 stores a target vehicle-to-vehicle time map. On the target vehicle-to-vehicle time map, as shown in FIG. 5, a target vehicle-tovehicle time td* is set to decrease as the vehicle speed Vn increases and the set vehicle-to-vehicle distance decreases. The target vehicle-to-vehicle time calculation unit 12 calculates the target vehicle-to-vehicle time td* by applying the vehicle speed Vn and the set vehicle-to-vehicle distance to the target vehicle-to-vehicle time map. The target vehicle-to-vehicle time calculation unit 12 then supplies the calculated target vehicle-to-vehicle time td* to the following target acceleration calculation unit 13.

[Following Target Acceleration Calculation Unit]

The following target acceleration calculation unit 13 is a control block that calculates a target acceleration used as a basis when the following control is implemented upon detection of a preceding vehicle. The following target acceleration calculation unit 13 calculates a following target acceleration Afollow* upon reception of the following acceleration characteristic AF set by the acceleration characteristic setting unit 11, the target vehicle-to-vehicle time td* calculated by the target vehicle-to-vehicle time calculation unit 12, the preceding vehicle information (the host-vehicle-to-preceding-vehicle distance and the preceding vehicle relative speed) transmitted from the preceding vehicle sensor unit 21, and the vehicle speed WI detected by the vehicle speed sensor 23.

The following target acceleration calculation unit 13 calculates an acceleration side following target acceleration Afollow1* and a deceleration side following target acceleration Afollow2* using Equations (1) and (2), shown below. When the deceleration side following target acceleration Afollow2* takes a negative value (Afollow2*<0 m/s$^2$), the following target acceleration calculation unit 13 employs the deceleration side following target acceleration Afollow2* as the following target acceleration Afollow* (Afollow*=Afollow2*), and in all other cases, the following target acceleration calculation unit 13 employs the acceleration side following target acceleration Afollow1* as the following target acceleration Afollow* (Afollow*=Afollow1*).

$$A\text{follow}1^* = ((\Delta D \times K1) + (Vr \times K2)) \times Ka \quad (1)$$

$$A\text{follow}2^* = ((\Delta D \times K1) + (Vr \times K2)) \quad (2)$$

Here, ΔD is a vehicle-to-vehicle deviation, to be described below, K1 and K2 are gains, Vr is the preceding vehicle relative speed, to be described below, and Ka is an acceleration side gain. Further, the acceleration side following target acceleration Afollow1* has a lower limit value of zero, and therefore, when the calculation result indicates a negative value, the acceleration side following target acceleration Afollow1* is set at zero by lower limit processing. Moreover, the deceleration side following target acceleration Afollow2* has an upper limit value of zero, and therefore, when the calculation result indicates a positive value, the deceleration side following target acceleration Afollow2* is set at zero by upper limit processing.

The vehicle-to-vehicle deviation ΔD is a value obtained by subtracting a target vehicle-to-vehicle distance (which is calculated by multiplying the vehicle speed Vn by the target vehicle-to-vehicle time td*) from the actual host-vehicle-to-preceding-vehicle distance. Hence, in a situation where the actual host-vehicle-to-preceding-vehicle distance is greater than the target vehicle-to-vehicle distance, the vehicle-to-vehicle deviation ΔD takes a positive value so as to act in a direction for increasing the following target acceleration Afollow*. The gains K1 and K2 are positive adjustment values, and may be set at fixed values or values that are adjusted in accordance with other parameters. The preceding vehicle relative speed. Yr is the speed of the preceding vehicle relative to the host vehicle, and takes a value obtained by subtracting the vehicle speed of the host vehicle from the vehicle speed of the preceding vehicle. Hence, in a situation where the preceding vehicle is speeding away from the host vehicle, the preceding vehicle relative speed Vr takes a positive value so as to act in a direction for increasing the following target acceleration Afollow*.

Figure 6:
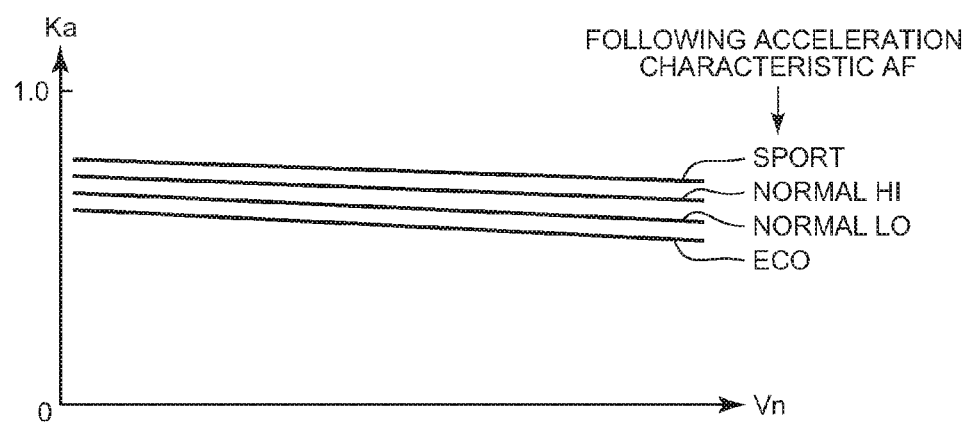
FIG. 6 is a graph illustrating an acceleration side gain map.

The acceleration side gain Ka is a positive value used to adjust the magnitude of the acceleration side following target acceleration Afollow1. The acceleration side gain Ka is calculated on the basis of the following acceleration characteristic AF set by the acceleration characteristic setting unit 11, and the vehicle speed Vn. More specifically, the following target acceleration calculation unit 13 stores an acceleration side gain map shown in FIG. 6, and calculates the acceleration side gain Ka by applying the following acceleration characteristic AF and the vehicle speed Vn to the acceleration side gain map.

The acceleration side gain map is set such that the acceleration side gain Ka increases when the following acceleration characteristic AF corresponds to a drive mode in which the required engine output characteristic is high. In other words, the acceleration side gain Ka is set to take a maximum value in the sport travel acceleration characteristic, and to decrease sequentially in the normal HI travel acceleration characteristic, the normal LO travel acceleration characteristic, and the eco-travel acceleration characteristic. Hence, the acceleration side gain Ka is set to increase as the engine output characteristic of the drive mode selected by the driver increases. Further, the acceleration side gain Ka of each following acceleration characteristic AF is set to decrease gradually as the vehicle speed Vn increases.

The following target acceleration calculation unit 13 calculates the acceleration side following target acceleration Afollow1 by inserting the acceleration side gain Ka set in this manner into Equation (1).

The following target acceleration calculation unit 13 calculates the following target acceleration Afollow* at predetermined calculation period intervals, and supplies each calculated following target acceleration Afollow* to the target acceleration arbitration unit 17. Note that when a preceding vehicle is not detected, the following target acceleration calculation unit 13 sets the following target acceleration Afollow* at a value that is in effect too large to be generated by the host vehicle.

[Constant Speed Travel Target Acceleration Calculation Unit]

The constant speed travel target acceleration calculation unit 14 is a control block that calculates a target acceleration to be used when the constant speed control is implemented. As shown below in Equation (3), the constant speed travel target acceleration calculation unit 14 calculates a constant speed travel target acceleration Aconst* on the basis of the vehicle speed Vn detected by the vehicle speed sensor 23 and the set vehicle speed Vset set by the driver using the assistance operation switch 22.

$$A\text{const}^* = (V\text{set} - Vn) \times K3 \quad (3)$$

Figure 7:
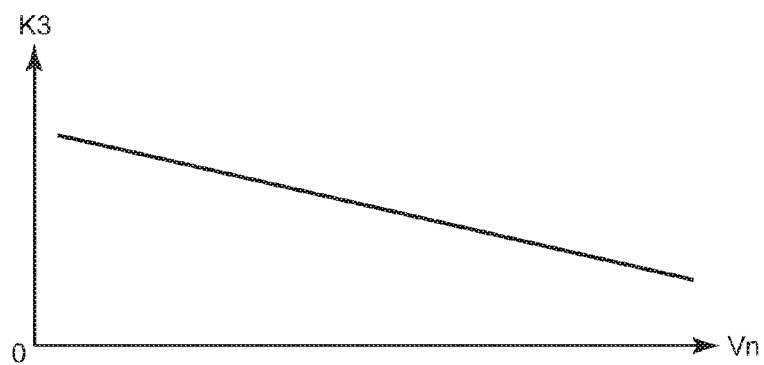
FIG. 7 is a graph illustrating a constant speed travel acceleration gain map.

Here, K3 is a constant speed travel acceleration gain that is set at a positive value corresponding to the vehicle speed Vn. More specifically, the constant speed travel target acceleration calculation unit 14 stores a constant speed travel acceleration gain map. On the constant speed travel acceleration gain map, as shown in FIG. 7, for example, the constant speed travel acceleration gain K3 is set to be smaller when the vehicle speed Vn is high than when the vehicle speed Vn is low. The constant speed travel target acceleration calculation unit 14 calculates the constant speed travel acceleration gain K3 by applying the actual vehicle speed Vn to the constant speed travel acceleration gain map.

When a vehicle speed deviation (Vset−Vn) serving as the first term on the right side of Equation (3) is positive, the constant speed travel target acceleration Aconst* is calculated so as to act in a direction for accelerating the host vehicle, and when the vehicle speed deviation (Vset−Vn) is negative, the constant speed travel target acceleration Aconst* is calculated so as to act in a direction for decelerating the host vehicle.

The constant speed travel target acceleration calculation unit 14 calculates the constant speed. travel target acceleration Aconst* at predetermined calculation period intervals, and supplies each calculated constant speed travel target acceleration Aconst* to the target acceleration arbitration unit 17.

[Curve Travel Target Acceleration Calculation Unit]

The curve travel target acceleration calculation unit 15 is a block that calculates a curve travel target acceleration Acurve* as a target acceleration to be used when traveling on a curved road. The curve travel target acceleration calculation unit calculates the curve travel target acceleration Acurve* on the basis of the vehicle speed Vii detected by the vehicle speed sensor 23 and the yaw rate Yaw detected by the yaw rate sensor 24 using Equations (4), (4-1), and (4-2), shown below.

$$A\text{curve}^* = (V\text{curve} - Vn) \times K4 \quad (4)$$

Here, Vcurve is an allowable speed allowed during travel on a curve, and is calculated using Equation (4-1). In Equation (4-1), sqrt denotes a function used to determine a square root value.

$$V\text{curve} = \text{sqrt}(R \times Gcy) \quad (4\text{-}1)$$

R is an estimated curve radius of the road in the travel position of the host vehicle, and is calculated using Equation (4-2). In Equation (4-2), Kr is a conversion coefficient. Note that the estimated curve radius R may be obtained by, for example, detecting left and right lane markers (white lines) of a travel lane using the camera sensor 21b and calculating the curve radius from the lines serving as the lane markers.

$$R = Kr \times (Vn/\text{Yaw}) \quad (4\text{-}2)$$

Further, Gcy is an allowable lateral acceleration during travel on a curve, and is set in advance. K4 is a gain having a preset magnitude.

The curve travel target acceleration Acurve* has a lower limit value of zero, and therefore, when the calculation result indicates a negative value, the curve travel target acceleration Acurve* is set at zero by lower limit processing.

The curve travel target acceleration calculation unit 15 calculates the curve travel target acceleration Acurve* at predetermined calculation period intervals, and supplies each calculated curve travel target acceleration Acurve* to the target acceleration arbitration unit 17.

[Upper Limit Target Acceleration Calculation Unit]

The upper limit target acceleration calculation unit 16 is a control block that calculates an upper limit value of the target acceleration. The upper limit target acceleration calculation unit 16 calculates an upper limit target acceleration Alimit* upon reception of the vehicle speed Vn detected by the vehicle speed sensor 23, the following acceleration characteristic AF set by the acceleration characteristic setting unit 11, and the preceding vehicle information (here, information indicating the presence or absence of a preceding vehicle) transmitted from the preceding vehicle sensor unit 21).

Figure 8:
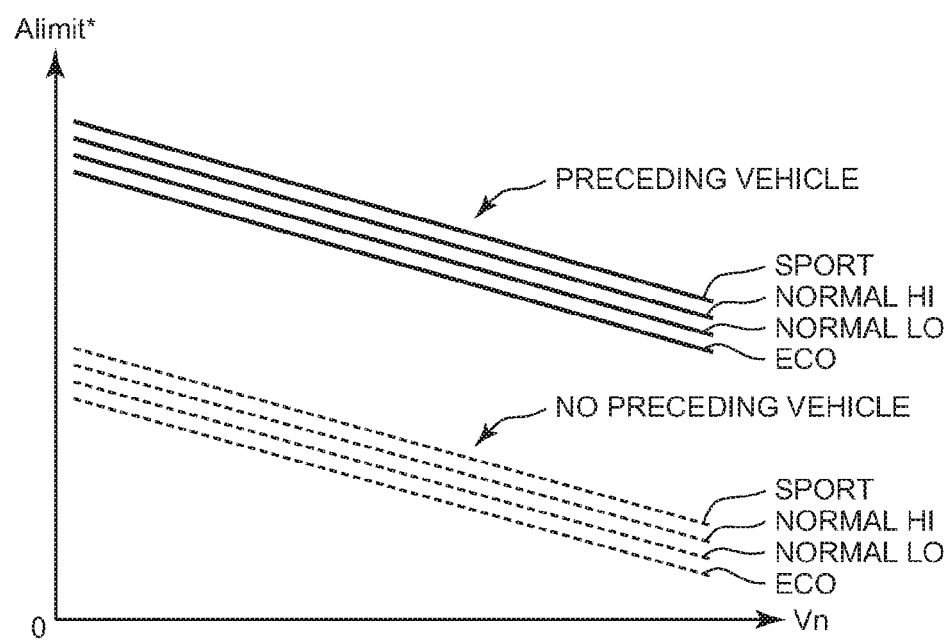
FIG. 8 is a graph illustrating an upper limit acceleration map.

The upper limit target acceleration calculation unit 16 stores an upper limit acceleration map shown in FIG. 8, and calculates the upper limit target acceleration Alimit* by referring to the upper limit acceleration map. On the upper limit acceleration map, the upper limit target acceleration Alimit* is set in accordance with the following acceleration characteristic AF with respect to a case in which a preceding vehicle is detected and a case in which a preceding vehicle is not detected. The upper limit acceleration map is set such that the upper limit target acceleration Alimit* increases when the following acceleration characteristic AF corresponds to a drive mode in which the required engine output characteristic is high. In other words, the upper limit target acceleration Alimit* is set to take a maximum value in the sport travel acceleration characteristic, and to decrease sequentially in the normal HI travel acceleration characteristic, the normal LO travel acceleration characteristic, and the eco-travel acceleration characteristic. Hence, the upper limit target acceleration Alimit* is set to increase as the engine output characteristic of the drive mode selected by the driver increases. Further, the upper limit target acceleration Alimit* is set to be larger when a preceding vehicle is detected than when a preceding vehicle is not detected.

[Target Acceleration Arbitration Unit]

The target acceleration arbitration unit 17 receives the following target acceleration Afollow* calculated by the following target acceleration calculation unit 13, the constant speed travel target acceleration Aconst* calculated by the constant speed travel target acceleration calculation unit 14, the curve travel target acceleration Acurve* calculated by the curve travel target acceleration calculation unit 15, and the upper limit target acceleration Alimit* calculated by the upper limit target acceleration calculation unit 16.

As shown below in Equation (5), the target acceleration arbitration unit 17 selects the smallest value among the received following target acceleration Afollow*, constant speed travel target acceleration Aconst*, curve travel target acceleration Acurve*, and upper limit target acceleration Alimit*, and sets the selected value as a final target acceleration A*.

$$A^* = \min(A\text{follow}^*, A\text{const}^*, A\text{curve}^*, A\text{limit}^*)) \quad (5)$$

Here, min denotes a function for selecting the minimum value among the numerical values in parentheses.

The target acceleration arbitration unit 17 calculates the target acceleration A (i.e. performs minimum value selection processing) at predetermined calculation period intervals, and supplies each calculated target acceleration A* to the required driving force calculation unit 18.

[Required Driving Force Calculation Unit]

The required driving force calculation unit 18 calculates an acceleration deviation ΔA (=A*−An), which is a deviation between the target acceleration A* and an actual acceleration An serving as the actual acceleration of the host vehicle, and calculates the required driving force F* on the basis of the acceleration deviation ΔA. As shown below in Equation (6), for example, the required driving force calculation unit 18 sets a value obtained by adding the required driving force F*(n−1) of the previous calculation period to a value obtained by multiplying the acceleration deviation ΔA by a gain K5 as the required driving force F*.

$$F^* = (A^* - An) \times K5 + F^*(n-1) \quad (6)$$

The required driving force calculation unit 18 calculates the required driving force F* at predetermined calculation period intervals, and supplies each calculated required driving force F* to the engine ECU 30. Accordingly, the driving force is controlled such that the host vehicle accelerates (including deceleration) at the target acceleration A*. As a result, the vehicle can be caused to travel at an appropriate acceleration for the following control or the constant speed control. Note that the actual acceleration An used in Equation (6) may be obtained by performing a differential operation on the vehicle speed Vn, or obtained from a detection value of a front-rear acceleration sensor (not shown) provided on a vehicle body. When a large braking force is required such that the requirement cannot be met by the engine 31 and the transmission 32 alone, the engine ECU 30 transmits the required braking force to the brake ECU 40 so that the shortfall is generated using the hydraulic brake.

With the driving assistance apparatus for a vehicle according to this embodiment, as described above, the magnitudes of the respective values of the following target acceleration Afollow* and the upper limit target acceleration Alimit* are adjusted on the basis of the drive mode selected by the driver in accordance with the engine output characteristic specified by the drive mode. For example, the following target acceleration Afollow* and the upper limit target acceleration Alimit* are set at larger values in a drive mode having a high engine output characteristic, and at smaller values in a drive mode having a low engine output characteristic. As a result, the following control can be implemented in accordance with the preferences of the driver. Further, the following acceleration characteristic AF is set in accordance with the delivery destination of the vehicle, and therefore the following control can be implemented in accordance with the preferences of the driver within a range where a suitable acceleration characteristic for the delivery destination is obtained.

The driving assistance apparatus for a vehicle according to this embodiment was described above, but the disclosure is not limited to the above embodiment, and may be subjected to various modifications within a scope that does not depart from the object of the disclosure.

For example, in this embodiment, four target accelerations are input into the target acceleration arbitration unit 17 and the smallest value thereof is selected as the final target acceleration A*, but the disclosure is not limited to this configuration, and instead, for example, the smaller of the following target acceleration Afollow* and the upper limit target acceleration Alimit* may be employed as the final target acceleration A*.

Further, in this embodiment, the following acceleration characteristic AF is set on the basis of the drive mode selected by the driver and the delivery destination, but the following acceleration characteristic AF does not necessarily have to correspond to the delivery destination. Instead, for example, the following acceleration characteristic AF may be set on the basis of only the drive mode selected by the driver.

Furthermore, the driving assistance apparatus according to this embodiment is applied to a vehicle that includes an engine as the travel drive source, but the disclosure is not limited thereto, and the driving assistance apparatus may be applied to another vehicle such as an electric vehicle, a hybrid vehicle, or a fuel cell vehicle, for example.

What is claimed is:

1. A driving assistance apparatus for a vehicle, comprising:
    a switch selecting a first drive mode that specifies a first output characteristic of a drive source relative to an accelerator operation amount and a second drive mode that specifies a second output characteristic of the drive source relative to the accelerator operation amount, the second output characteristic of the drive source being higher than the first output characteristic for a same accelerator operation amount; and
    a controller configured to
        calculate a target acceleration for each of the first and second drive modes, for causing a host vehicle to follow a preceding vehicle to maintain a vehicle-to-vehicle distance between the host vehicle and the preceding vehicle at a distance within a predetermined range, the target acceleration for the second drive mode being higher than the target acceleration for the first drive mode,
        calculate an upper limit acceleration target for each of the first and second drive modes, the upper limit acceleration target for the second drive mode being higher than the upper limit acceleration target for the first drive mode, and
        control a driving force of the drive source to accelerate the host vehicle at a selected target acceleration, within a corresponding upper limit target acceleration,
    wherein the upper limit acceleration target corresponding to each of the drive modes is higher when the host vehicle follows the preceding vehicle than when there is no preceding vehicle.

2. The driving assistance apparatus according to claim 1, wherein the controller is configured to
    obtain a delivery destination which is a territory in which the host vehicle is sold, and
    calculate the selected target acceleration based on the selected drive mode and the delivery destination.

3. The driving assistance apparatus according to claim 2, wherein the controller is configured to
    store a plurality of following acceleration characteristics in a larger number than a number of drive modes that is selected by the switch,
    select one of the following acceleration characteristic from the plurality of following acceleration characteristics based on a combination of the selected drive mode and the delivery destination, and
    calculate the selected target acceleration in accordance with the selected following acceleration characteristic.

4. A driving assistance control method, comprising:
    selecting between a first drive mode that specifies a first output characteristic of a drive source relative to an accelerator operation amount and a second drive mode that specifies a second output characteristic of the drive source relative to the accelerator operation amount, the second output characteristic of the drive source being higher than the first output characteristic for a same accelerator operation amount;
    calculating a target acceleration for each of the first and second drive modes, for causing a host vehicle to follow a preceding vehicle to maintain a vehicle-to-vehicle distance between the host vehicle and the preceding vehicle at a distance within a predetermined range, the target acceleration for the second drive mode being higher than the target acceleration for the first drive mode;
    calculating an upper limit acceleration target for each of the first and second drive modes, the upper limit acceleration target for the second drive mode being higher than the upper limit acceleration target for the first drive mode; and controlling a driving force of the drive source to accelerate the host vehicle at a selected target acceleration, within a corresponding upper limit acceleration target,
wherein the upper limit acceleration target corresponding to each of the drive modes is higher when the host vehicle follows the preceding vehicle than when there is no preceding vehicle.

* * * * *